United States Patent
Scaggs

(10) Patent No.: US 7,944,624 B2
(45) Date of Patent: May 17, 2011

(54) METHOD FOR HOMOGENIZING LIGHT

(76) Inventor: Michael J. Scaggs, Weston, FL (US)

(*) Notice: Subject to any disclaimer, the term of this patent is extended or adjusted under 35 U.S.C. 154(b) by 303 days.

(21) Appl. No.: 11/847,013

(22) Filed: Aug. 29, 2007

(65) Prior Publication Data
US 2009/0059394 A1 Mar. 5, 2009

(51) Int. Cl.
*G02B 3/08* (2006.01)
*G02B 27/10* (2006.01)

(52) U.S. Cl. .................... 359/741; 359/619
(58) Field of Classification Search .......... 359/741, 359/743, 724, 618–620
See application file for complete search history.

(56) References Cited

U.S. PATENT DOCUMENTS

| | | | |
|---|---|---|---|
| 2,326,970 A | 8/1943 | Rantsch | |
| 2,531,399 A | 11/1950 | Cawein et al. | |
| 3,670,260 A | 6/1972 | Koester et al. | |
| 4,475,027 A | 10/1984 | Pressley | |
| 4,733,944 A | 3/1988 | Fahlen et al. | |
| 5,098,184 A | 3/1992 | van den Brandt et al. | |
| 5,414,559 A | 5/1995 | Burghardt et al. | |
| 5,610,733 A | 3/1997 | Feldman et al. | |
| 5,721,416 A | 2/1998 | Burghardt et al. | |
| 5,796,521 A | 8/1998 | Kahlert et al. | |
| 6,157,500 A * | 12/2000 | Yamazaki et al. | 359/741 |
| 6,335,786 B1 | 1/2002 | Shiraishi | |
| 6,621,639 B2 | 9/2003 | Kahlert et al. | |

* cited by examiner

*Primary Examiner* — Alicia M Harrington
(74) *Attorney, Agent, or Firm* — Ronald E. Smith; Smith & Hopen, P.A.

(57) ABSTRACT

A method of homogenizing light includes the steps of providing a plurality of large diameter lenses selected from a group of lenses consisting of positive or negative spherical, positive or negative cylindrical lenses and positive or negative axicons, selecting a predetermined number of lenses from the group of lenses, segmenting each selected lens in a manner common to all selected lenses, selecting from each lens a predetermined number of lens segments, and arranging the selected lens segments in a predetermined array so that the light passing through each lens segment, when arranged in the predetermined array, recombines at a common plane.

15 Claims, 19 Drawing Sheets

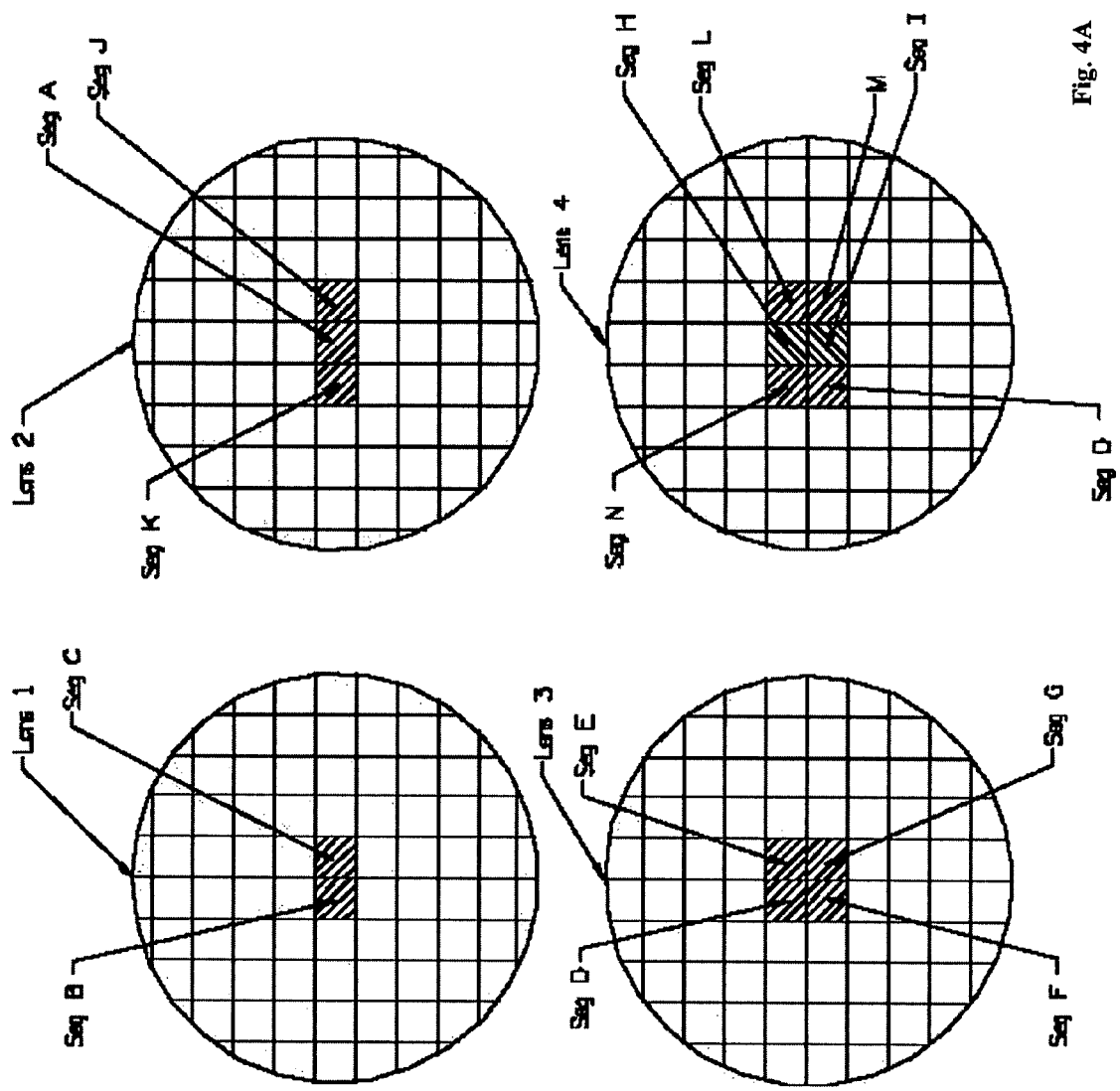

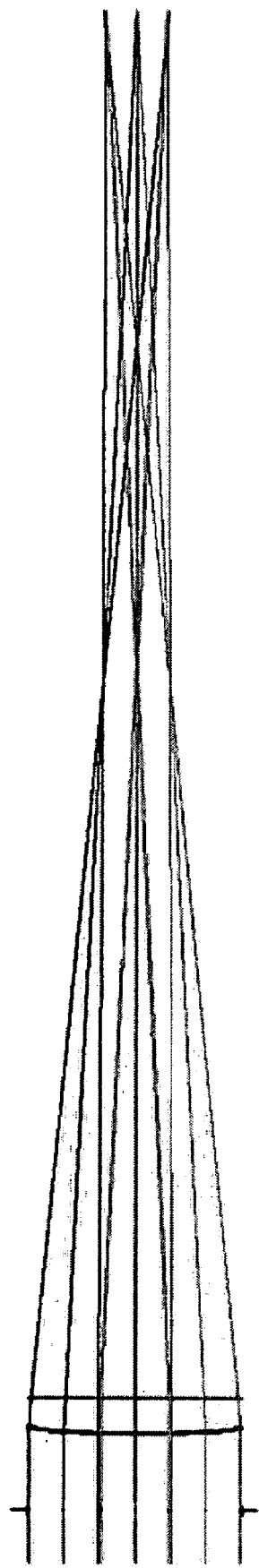

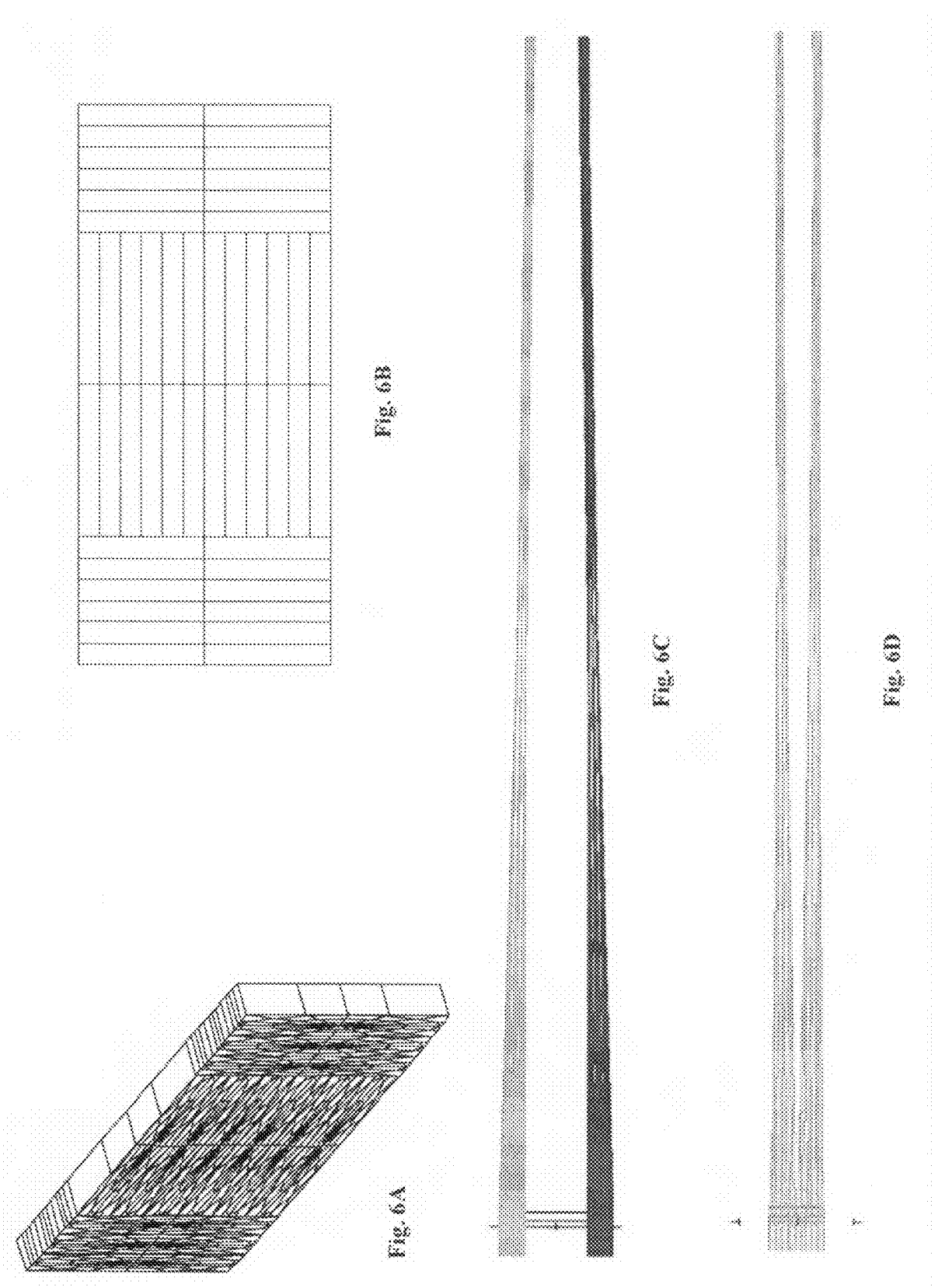

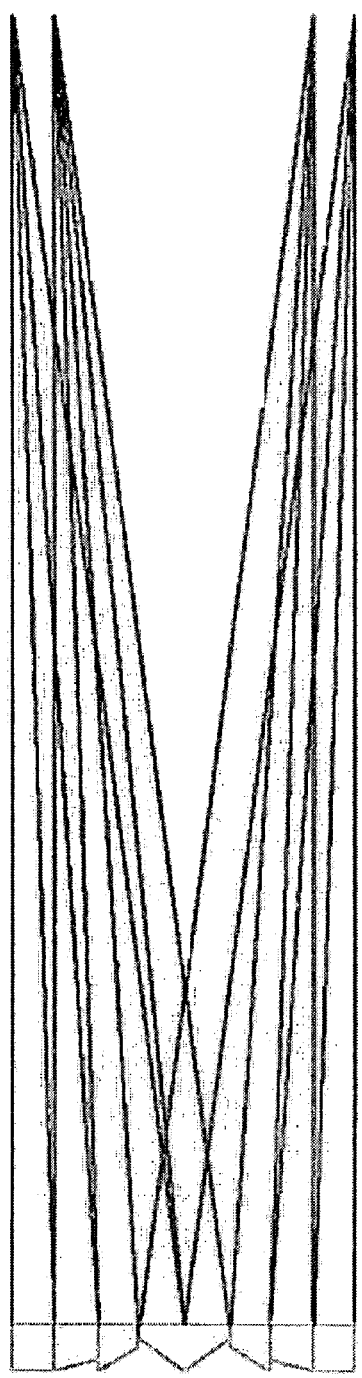
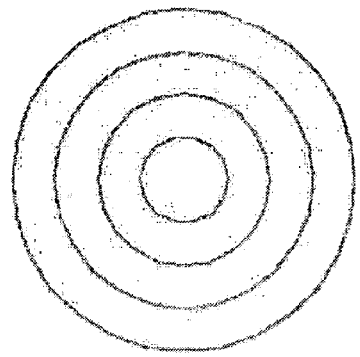
Fig. 8E

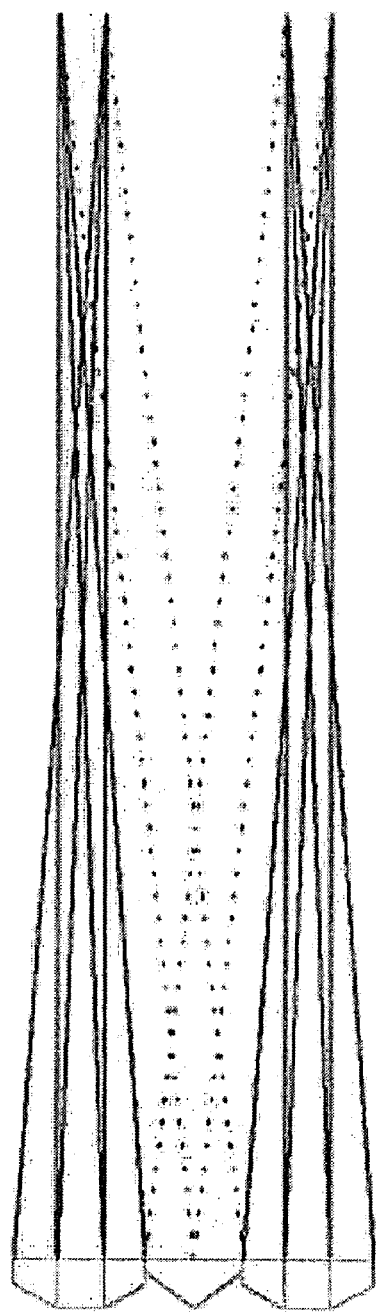
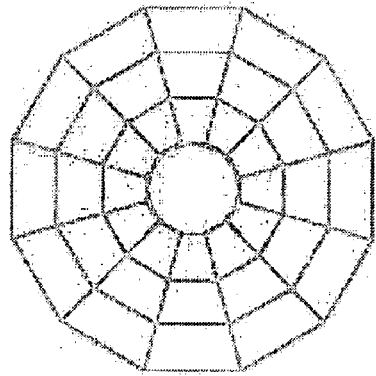
Fig. 8I

METHOD FOR HOMOGENIZING LIGHT

BACKGROUND OF THE INVENTION

1. Field of the Invention

This invention relates to an optical device that transforms a spatially, nonuniform laser beam into a spatially homogeneous profile suitable for precision micromachining with a laser or as an illumination source for a projection system.

2. Description of the Prior Art

U.S. Pat. No. 4,733,944 discloses a pair of crossed lenticular cylindrical lens structures coupled with a focusing lens. The total number of optical surfaces is ten (10). If a UV excimer laser is being homogenized, this number of surfaces represents a significant source of losses and costs in construction of the homogenizer. Moreover, the number of lens elements requires careful and precise alignment of the laser beam in relation to all of the optics comprising the homogenizer, in particular angular rotation of the lenslets and how they are positioned along the X and Y plane of the optical axis.

Lenticular lens arrays have been used for decades as illumination systems for TVs, projectors and other illumination devices, as disclosed in U.S. Pat. Nos. 2,326,970 and 2,531,399. They tend to have poor optical efficiency and are difficult to fabricate, especially for use in the ultraviolet spectrum.

The known prior art lens arrays include large numbers of optical components to create a homogenized spatial distribution of light in space as an illumination source for laser machining, a lithographic illuminator or as an integrator for any type of projection system. The known devices are unable to create a homogenized ring illumination to accommodate a greater number of illumination applications such as for microelectronic devices such as memory modules, multichip modules and the like.

Prior art homogenizers typically require a condenser with a focal length of one meter (1 m) plus the length needed for two pairs of crossed cylindrical lenses. A prior art homogenizer therefore has a focal length of about one and a half meters (1.5 m).

There is therefore a need for a homogenizer having a substantially shorter focal length.

However, in view of the prior art taken as a whole at the time the present invention was made, it was not obvious to those of ordinary skill how the identified needs could be fulfilled.

SUMMARY OF THE INVENTION

The long-standing but heretofore unfulfilled need for an improved homogenizer is now met by a new, useful, and non-obvious invention.

The inventive structure is a novel optical device that field maps a homogenized illumination by using either spherical or cylindrical lens segments and placing the lens segments in a mapped configuration whereby light passing through each lens segment combine and overlap at a homogenized plane. The homogenized mapped field can be in the shape of a rectangle, square or a rectangular ring illumination but is limited only by fabrication techniques for segmenting. This invention is therefore not limited to square, rectangular, or rectangular ring illuminations.

As used herein, the term "segmenting" refers to cutting a spherical, cylindrical or axicon lens into a plurality of lens segments. A cut is made through the entire thickness of the lens so each lens segment has the same thickness as the lens. The easiest way to cut out lens segments is to make a plurality of cuts equidistantly spaced apart from one another that are parallel to a central X axis of the lens and to make the same type of cuts that are parallel to a central Y axis of the lens. The resulting segments will be square if the spacing between the X axis cuts is the same as the spacing between the Y axis cuts. The segments will be rectangular with a height greater than a width if the spacing between the X axis cuts is greater than the spacing between the Y axis cuts. The segments will be rectangular with a width greater than a height if the spacing between the Y axis cuts is greater than the spacing between the X axis cuts.

Where spherical or cylindrical lenses are employed, the first step of the method is to select a number of spherical or cylindrical lenses. However, the spherical or cylindrical lenses are not mixed with one another, i.e., the novel homogenizer is made by assembling a plurality of lens segments cut from a plurality of spherical lens or by assembling a plurality of lens segments cut from a plurality of cylindrical lens. A single homogenizer therefore would not include lens segments from a spherical lens and lens segments from a cylindrical lens.

Where hybrid axicon/cylindrical lens segments are used, however, mixing of types of lens segments is required.

The second step is to cut each of the selected lenses into a plurality of lens segments using a common spacing between cuts for all of the lenses. Thus, if a first lens is cut into a plurality of square segments, the remaining lenses must be cut into the square segments as well and the square segments will be the same size for all of the lenses. Lens segments that lie on the periphery of the lens will not be square and are not used in building the novel array of lens segments.

The third step is to select certain lens segments from each lens. For example, where four (4) lenses are cut into a plurality of lens segments, this third step may be performed by selecting one (1) lens segment from a first lens, two (2) lens segments from a second and a third lens, and four (4) lens segments from a fourth lens.

The fourth and final step is to assemble the selected lens segments into an array.

The primary object of the invention is to create a homogenized spatial distribution of light in space as an illumination source for laser machining, a lithographic illuminator or as an integrator for any type of projection system.

Another important object is to make such a device with as few optical components as possible.

Another object is to create a homogenized ring illumination (circular or rectangular) to accommodate a greater number of illumination applications such as microelectronic devices including memory modules, multichip modules and the like.

Still another object is to create such an illumination without having a pupil whereby the intensity of light at the pupil could cause damage to an optical element placed near the pupil.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 4A depicts four (4) plano-concave lenses, illustrating the cuts made to segment them and providing cross-hatching to identify selected lens segments in each lens;

FIG. 5B is a ray trace diagram produced by the selected lens segments of FIG. 5A in their rearranged configuration;

FIG. 6A is a perspective view of a field-mapped rectangular ring illuminator made from segmented plano-convex cylinder lenses;

FIG. 6B is a front elevational view of the field-mapped rectangular ring illuminator of FIG. 6A;

FIG. 6C is a ray trace of the ring illuminator of FIG. 6A in the X-Z plane;

FIG. 6D is a ray trace of the ring illuminator of FIG. 6A in the Y-Z plane;

FIG. 8E is a ray trace of the circular ring illuminator of FIG. 8B and is identical for the X-Z and Y-Z planes;

FIG. 8I is a ray trace of the field-mapped circular ring illuminator of FIG. 8C;

DETAILED DESCRIPTION OF THE PREFERRED EMBODIMENT

Figure 1:
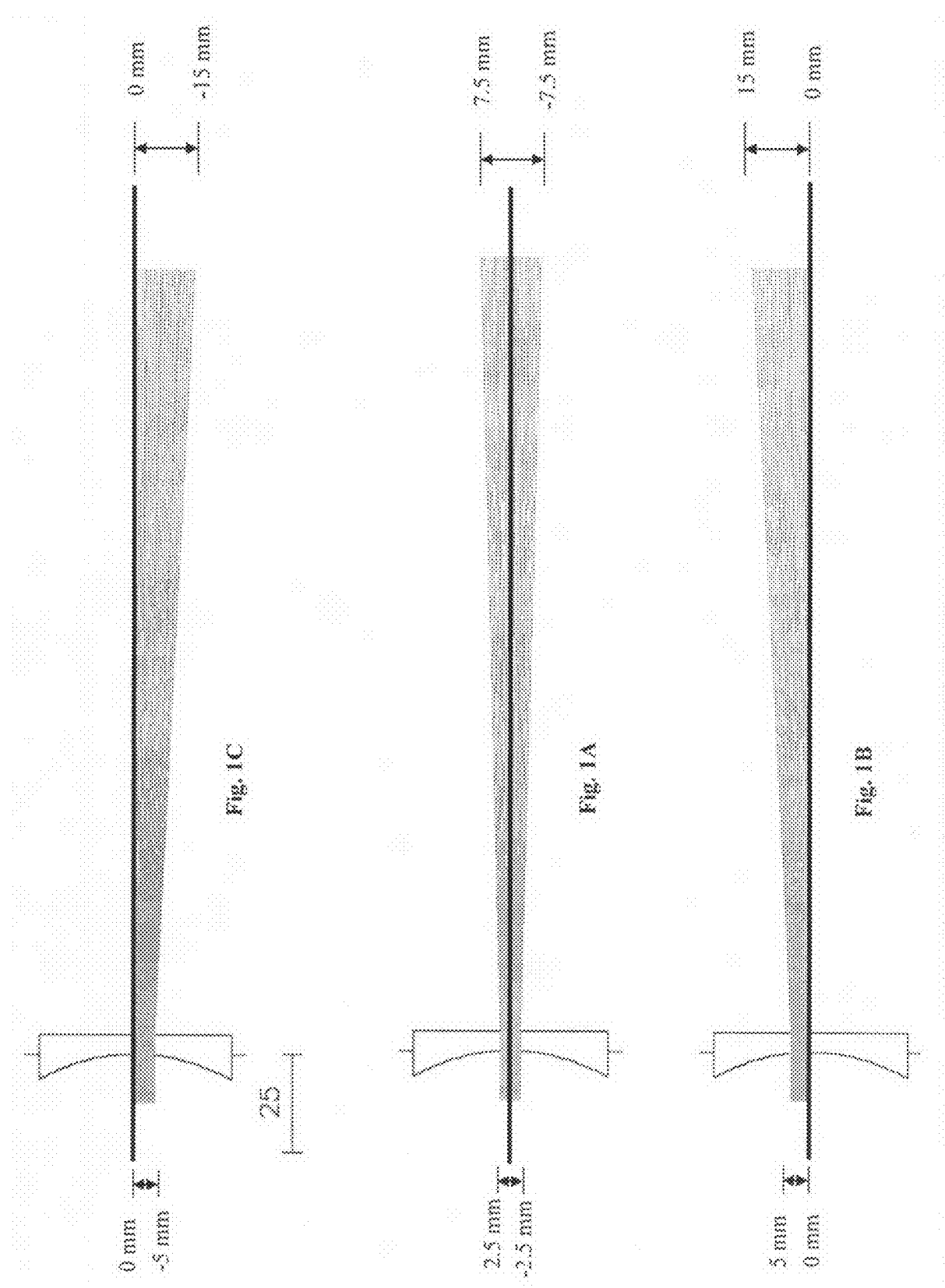
FIG. 1A is a diagrammatic view of a ray trace when light passes through a lens segment centered upon an optical axis of a plano-concave lens.
FIG. 1B is a ray trace like FIG. 1A when light passes through a lens segment positioned contiguous to and above the central lens segment of FIG. 1A.
FIG. 1C is a ray trace like FIG. 1A when light passes through a lens segment positioned contiguous to and below the central lens segment of FIG. 1A.

The novel field mapped homogenizer is made by taking a number of large diameter spherical or cylindrical lenses, either negative or positive, segmenting the lens in a predetermined way, selecting certain segments from each lens, and positioning the selected segments in a predetermined array so that the light passing through each lens segment recombines at a common plane.

FIGS. 1A-C depict a ray traces of a five millimeter (5 mm) patch of light through a negative spherical lens (plano-concave).

More particularly, in FIG. 1A, lens segment A depicts a 5 mm light patch centered on the optical axis of the lens, i.e., the top edge of said segment is positioned 2.5 mm above the optical axis and the bottom edge of said segment is positioned 2.5 mm below the optical axis. Light spreads out to a 15 mm patch at a distance of two hundred millimeters (200 mm) from the plano surface.

In FIG. 1B, lens segment B has the top edge of the light patch positioned 5 mm above the optical axis of the lens and the bottom edge coincident with the optical axis, i.e., the extreme rays propagate from the center of the optical axis (0 mm) and 5 mm above the optical axis. This produces a 15 mm wide patch that extends from the optical axis to a location 15 mm above said optical axis.

In FIG. 1C, lens segment C has the light patch originating from the optical axis and extending down by −5 mm, which is the opposite of lens segment B as is clear from a comparison of FIGS. 1B and 1C. This results in a light patch 200 mm away from the lens which extends fifteen millimeters (15 mm) downward from the optical axis.

Figure 2:
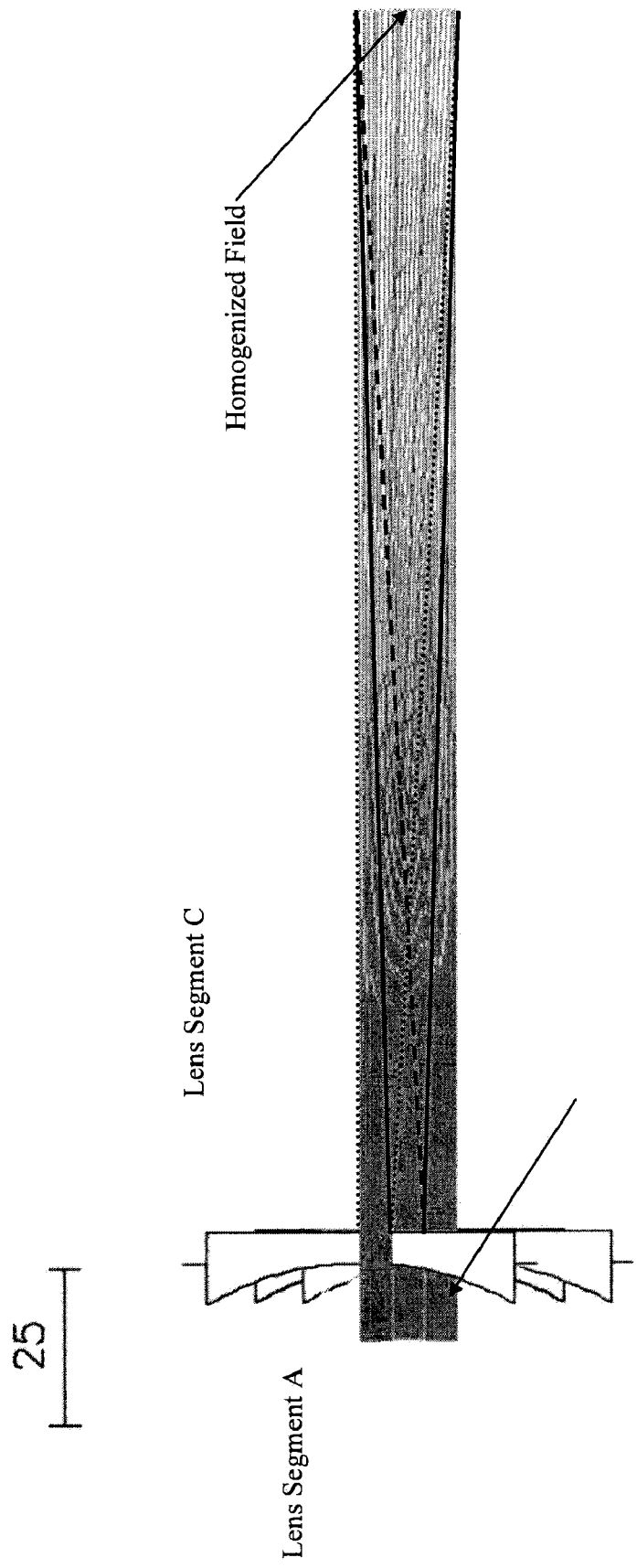
FIG. 2 is a ray trace that combines and superimposes the ray traces of FIGS. 1A-C to achieve a homogenized field.

Each of these three lens segments are cut out from their respective lenses and arranged as depicted in FIG. 2. In this example, lens segment A is positioned in the center. Lens segment B is placed contiguous to and below lens segment A which is a displacement of said lens segment B by −7.5 mm from the optical axis relative to its original position. Lens segment C is positioned contiguous to and above lens segment A which is a displacement of said lens segment C by +7.5 mm from the optical axis relative to its original position. The result of this arrangement is a fifteen millimeter (15 mm) homogenized patch of light as depicted in FIG. 2. FIG. 2 also shows the path of each lens segment by the lines. More particularly, solid lines are from lens segment A, hash mark lines are from lens segment B and dotted lines are from lens segment C.

Figure 3A:
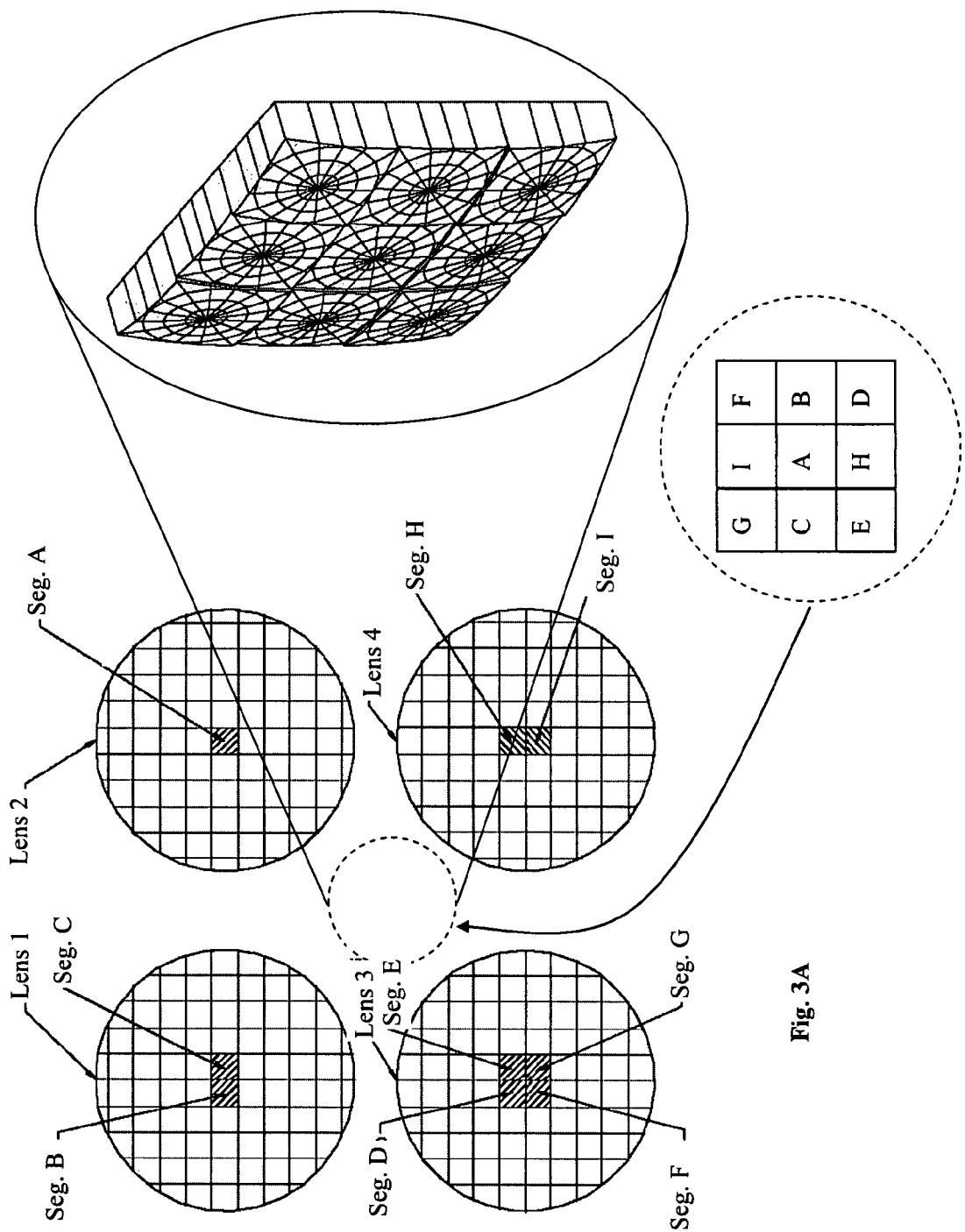
FIG. 3A includes three views superimposed upon one another, a first view depicting four (4) plano-concave lenses, illustrating the cuts made to segment them and providing cross-hatching to identify selected lens segments in each lens, a second view of a table showing how the selected lens segments are rearranged to form a homogenizer, and a third view projected from said table and depicting the selected lens segments in their rearranged configuration.

FIG. 3A depicts the preferred embodiment. Four (4) plano-concave spherical lenses, denoted lens 1, lens 2, lens 3 and lens 4, of nominal diameter fifty millimeters (50 mm) are segmented as illustrated in FIG. 3A.

Lens 1 is sectioned initially at the central Y axis and a plurality of parallel vertical cuts is spaced every 5 mm from both sides of the central Y axis in this particular example. Lens 1 is also initially sectioned at 2.5 mm above the central X axis and 2.5 mm below the central X axis and a plurality of parallel horizontal cuts are spaced every 5 mm from their contiguous horizontal cuts. These cuts collectively form a plurality of 5 mm square lens segments but lens segments of other sizes and shapes are within the scope of this invention. Note in FIG. 3A that the two cross-hatched lens segments are contiguous to one another, are positioned on opposite sides of the central Y axis, and are bisected by the central X axis.

Lens 2 is sectioned +2.5 mm and −2.5 mm from the center in both axes. In other words, the central-most lens segment in lens 2, which is cross-hatched for the purpose of identification, has an optical axis coincident with the optical axis of lens 2. More particularly, the second lens of said four lenses is sectioned by forming a first cut 2.5 mm from and parallel to the central Y axis, a second cut 2.5 mm from and parallel to the central Y axis on a side opposite from the first cut, forming a third cut 2.5 mm above and parallel to the central X axis, a second cut 2.5 mm below and parallel to the central X axis and repeating said sectioning every 5 mm in both the X and Y axes, said cuts forming a central lens segment having an optical axis coincident with an optical axis of said second lens as aforesaid and said cuts forming a plurality of lens segments that are 5 mm in width and 5 mm in height.

Lens 3 is sectioned from the center in both axes and then continued every 5 mm. More particularly, the third lens of said four lenses is sectioned by forming a first cut coincident with the central X axis and a second cut coincident with the central Y axis and forming a plurality of cuts parallel to the first and second cuts every 5 mm. Note in FIG. 3A that the four cross-hatched lens segments are centered around the center of said third lens.

Lens 4 is sectioned in the same way as lens 1 except it is rotated ninety degrees (90°) after segmenting. More particularly, the fourth lens is sectioned by forming a cut coincident with the central X axis and repeating said sectioning with parallel cuts every 5 mm above and below said X axis. The fourth lens is further sectioned by forming a first vertical cut 2.5 mm from the central Y axis in parallel relation thereto on a first side of said Y axis, forming a second vertical cut 2.5 mm from the central Y axis in parallel relation thereto on a second side of said Y axis, and forming a plurality of additional cuts on opposite sides of said central Y axis in parallel relation thereto at 5 mm spacings. Note that the two cross-hatched lens segments of the fourth lens are contiguous to one another, are positioned above and below the central X axis, and are bisected by the central Y axis.

The number of lenses needed is dependent upon the final mapping needed and therefore it could be more or less than the number in the example of FIG. 3A.

FIG. 3A further illustrates a simple three times three (3×3) homogenizer and its mapping. Lens segment A from Lens 2 is placed in the center of the array. The rest of the lens segments are organized as depicted in the table of FIG. 3A which is shown in enlarged view as follows:

| Seg G | Seg I | Seg F | 15 mm |
|-------|-------|-------|-------|
| Seg C | Seg A | Seg B |       |
| Seg E | Seg H | Seg D |       |

Figure 3B:
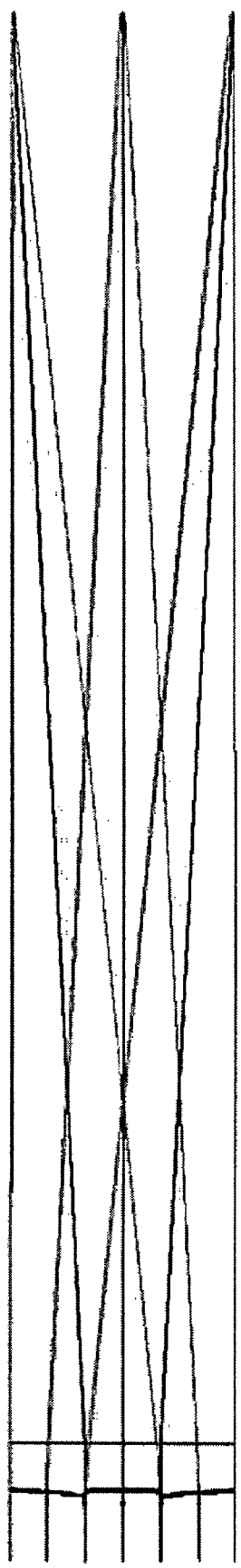
FIG. 3B is a ray trace diagram produced by the selected lens segments of FIG. 3A in their rearranged configuration.
Figure 3C:
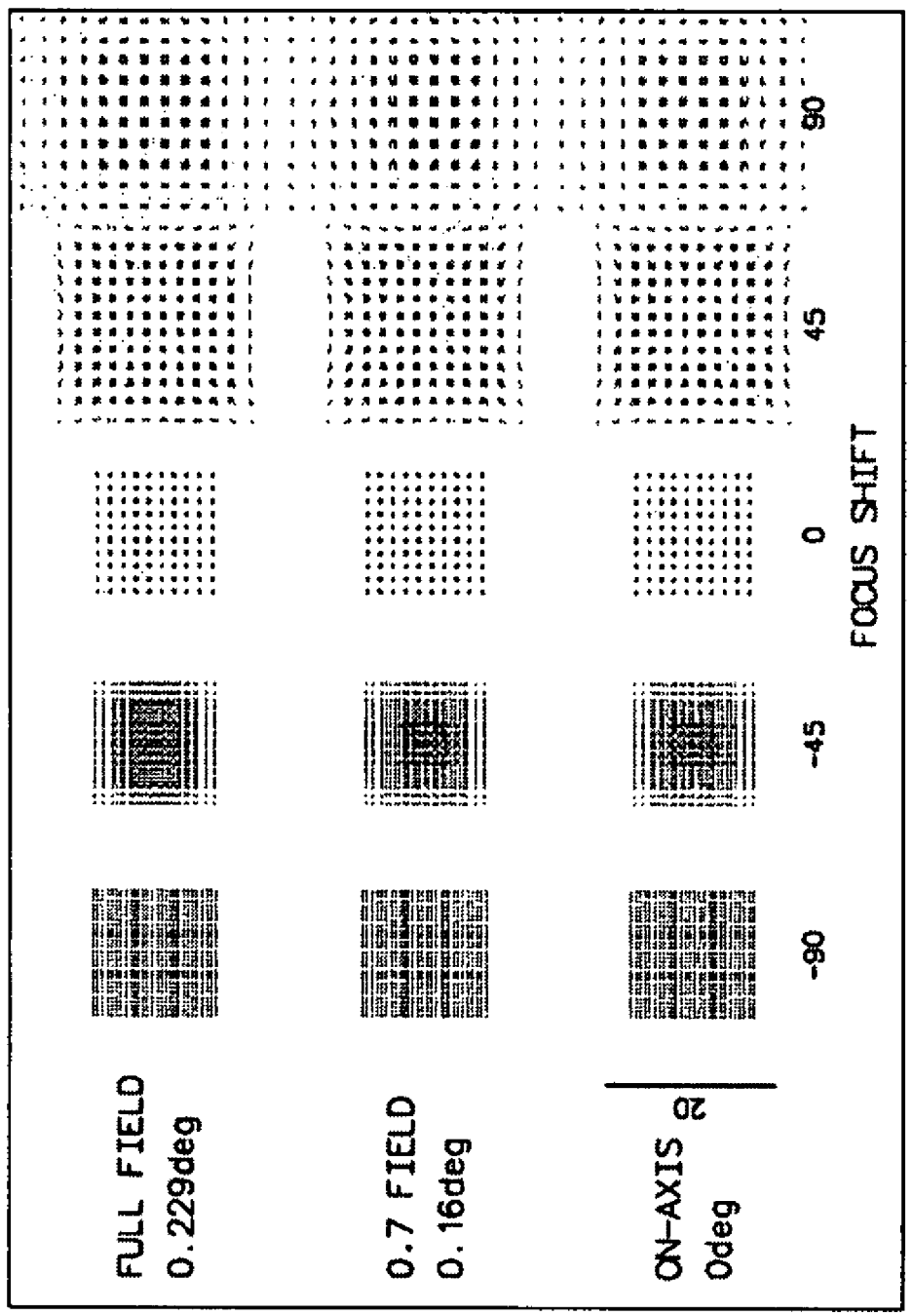
FIG. 3C is a spot diagram of the negative field-mapped homogenizer of FIG. 3A.

This homogenizer produces a 15×15 mm homogenized field as perhaps best understood in connection with the projection lines drawn from the table to the array of nine (9) 5×5 mm lens segments at the right-hand side of FIG. 3A. The ray trace of FIG. 3B illustrates this as does the focus spot shift graphic in FIG. 3C. The focus shift is in millimeters where the "0" point is the homogenized field and as it goes negative it approaches the lens segments. FIG. 3C is a spot diagram of a negative field mapped homogenizer constructed out of lens segments from four (4) plane-concave spherical lenses.

When the field mapped homogenizer includes negative lens elements, the homogenized field will be the size of the combined lens segments. In the example of FIG. 4A, this is three times five millimeters (3×5 mm) which is fifteen millimeters (15 mm).

The array of lens segments can be a larger number to achieve a greater degree of homogenization due to the increased number of lens elements. A three times five (3×5) array of five millimeter (5 mm) segments is a good arrangement for a typical excimer laser having a beam size of 10 mm×25 mm because it fully homogenizes the laser beam without adding a beam shaping telescope for filling the homogenizer aperture.

Figure 4B:
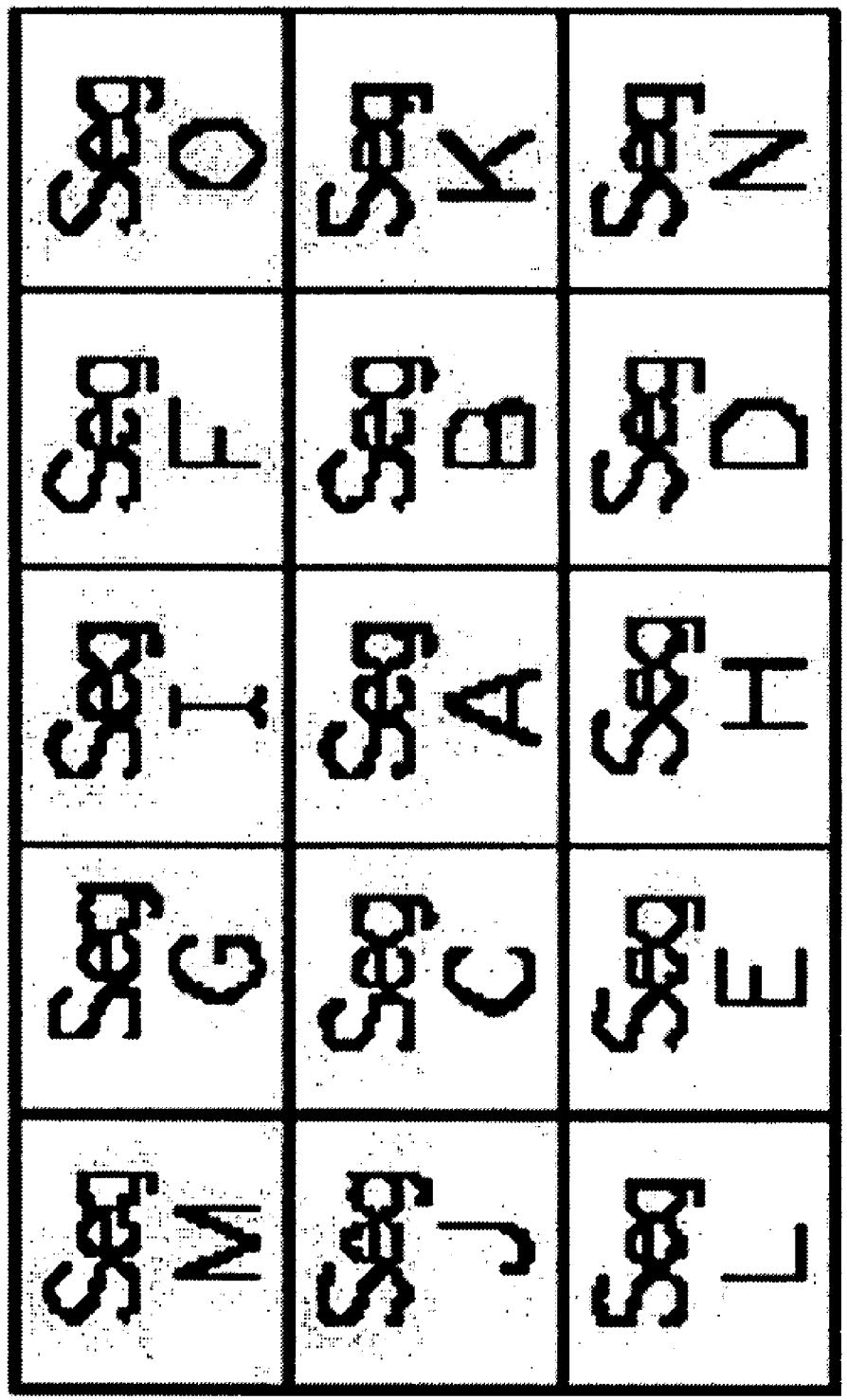
FIG. 4B is a table showing how the fifteen (15) selected lens segments of FIG. 4A are rearranged to form a homogenizer having a three by five array of lens segments.

FIG. 4B illustrates such a mapping for a three times five (3×5) array.

It is important to note that the homogenized field is still 15 mm×15 mm. The size of the homogenized field is dictated predominately by the size of lens segment A. All other lens segments are segmented and mapped to match the size of lens segment A.

It will be obvious to those skilled in the art that by appropriate combining of the unused lens segments in FIG. 4A one can create a higher degree of homogenization but maintain the same homogenized field size achieved in the 3×3 array illustrated herein.

Figure 5A:
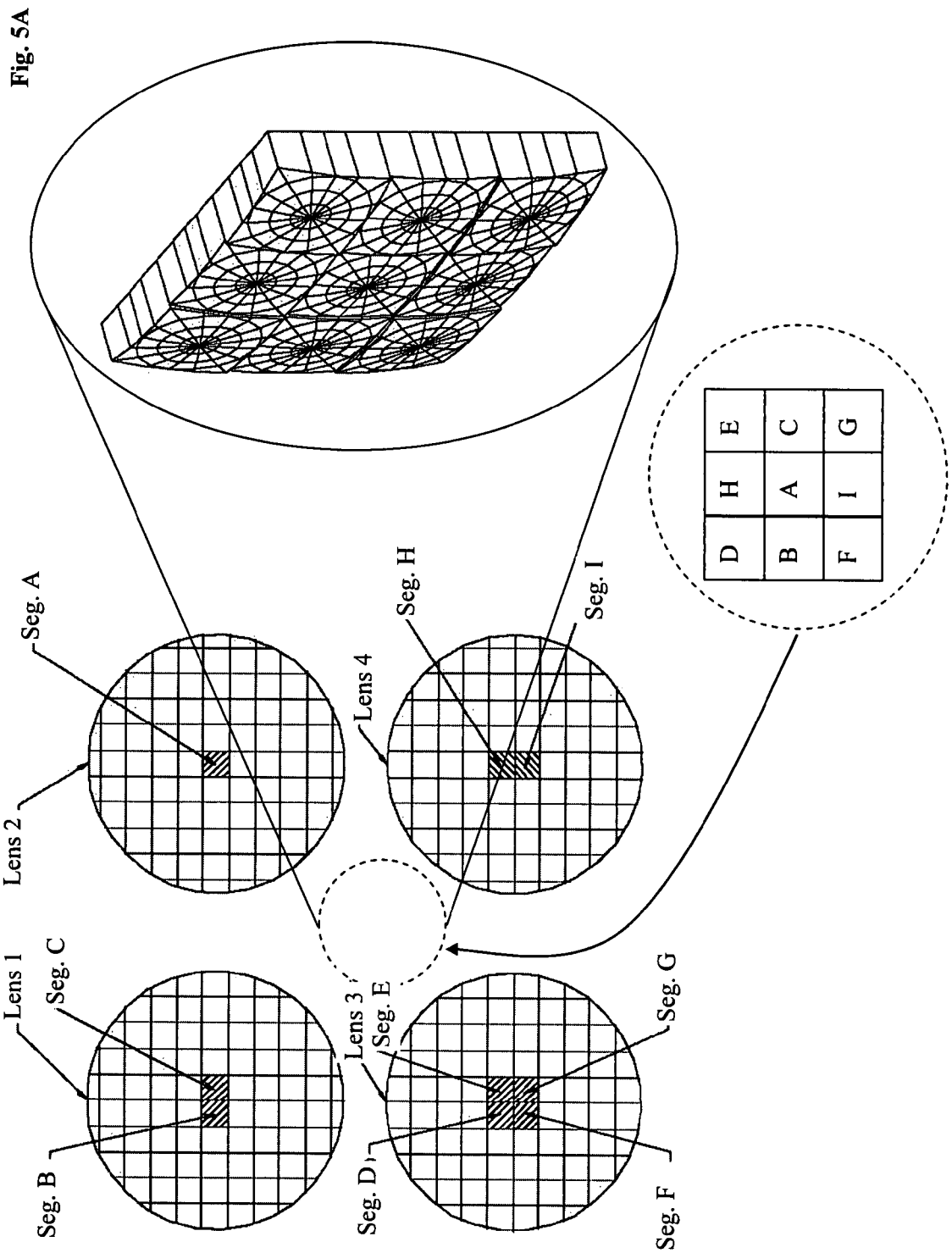
FIG. 5A is a view like that of FIG. 3A in that FIG. 5A includes three views superimposed upon one another, a first view depicting four (4) plano-convex lenses, illustrating the cuts made to segment them and providing cross-hatching to identify selected lens segments in each lens, a second view of a table showing how the selected lens segments are rearranged to form a homogenizer, and a third view projected from said table and depicting the selected lens segments in their rearranged configuration.

FIG. 5A illustrates a simple 3×3 homogenizer and its mapping for the positive lens scenario. In this example, there are four (4) plano-convex positive lenses that are sectioned in the same manner as in the previous example. The mapping, however, is different as indicated in said FIG. 5A and as enlarged in the following table:

| Seg D | Seg H | Seg E |
|-------|-------|-------|
| Seg B | Seg A | Seg C |
| Seg F | Seg I | Seg G |

In this example, the homogenized field is the size of the segment A element, i.e., the central element. If, for example, the large lens is segmented into 5 mm×5 mm lens segments, the homogenized field will be 5 mm×5 mm. This is depicted in the ray trace of FIG. 5B.

Figure 5C:
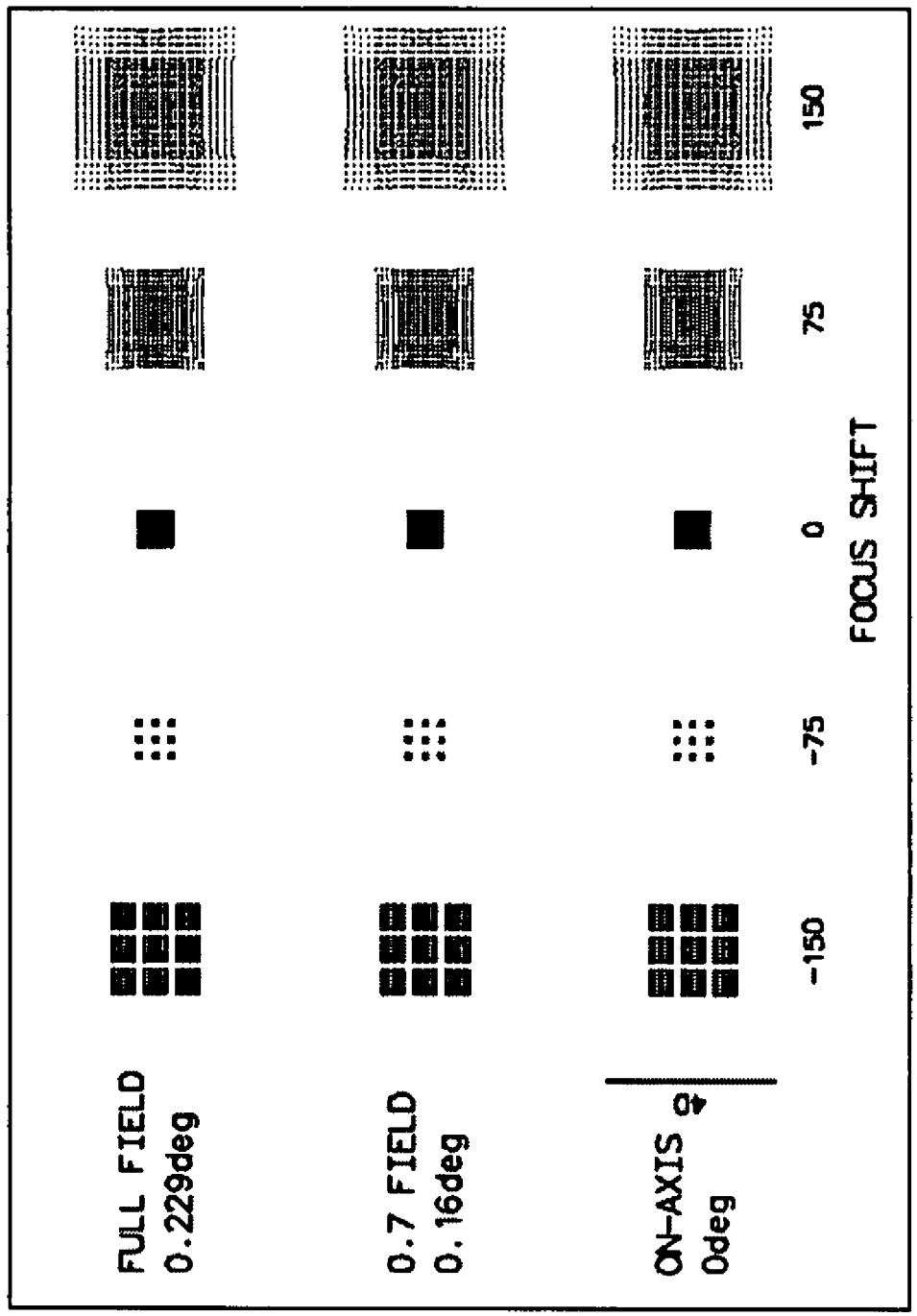
FIG. 5C is a spot diagram of the positive field-mapped homogenizer of FIG. 5A.

FIG. 5C is a spot diagram of a positive field mapped homogenizer constructed out of lens segments from four (4) plane-convex spherical lenses.

Figure 7:
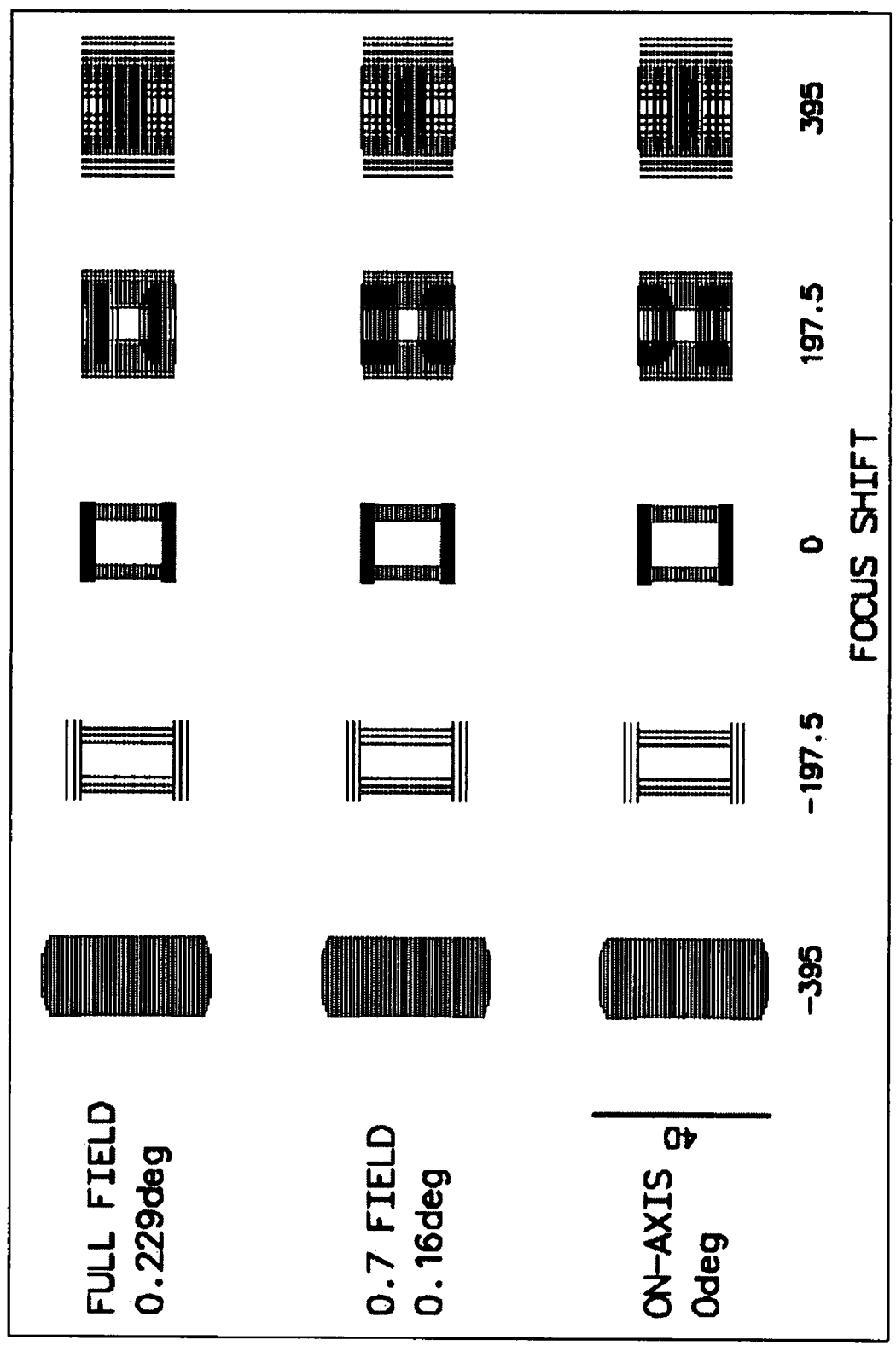
FIG. 7 is a spot diagram of a field-mapped ring illuminator made of preselected lens segments from seven (7) plano-convex cylinder lenses.

FIG. 6A is a perspective view of a ring illuminator based upon the field mapped homogenizer concept, and FIG. 6B is a front elevational view thereof. FIG. 6C is a ray trace in the X-Z plane and FIG. 6D is a ray trace in the Y-Z plane. In this configuration, seven (7) plano-convex cylinder lenses are segmented and mapped to form a rectangular homogenized field that is 13 mm×21 mm. The homogenized width of each line in the ring is three millimeters (3 mm) as indicated in the spot diagram of FIG. 7. This efficiently uses the laser's energy over a larger area than possible with a conventional homogenizer. In a typical excimer laser optical system, an ablation fluence of 500 mJ/cm² might be required. A field of 13 mm×21 mm would require an astonishing 1.36 J of energy on target; this is unrealistic for most industrial excimer lasers. The field mapped ring illuminator requires only 465 mJ which is achievable with current excimer technology.

Figure 8C:
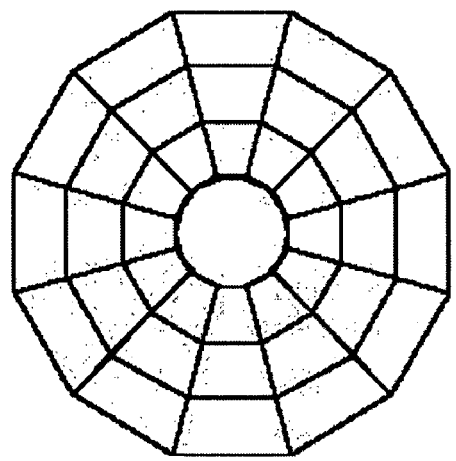
FIG. 8C is a front elevation view of a field-mapped circular ring illuminator made from segmented plano-convex cylinder lenses and a single axicon lens in the center.
Figure 8B:
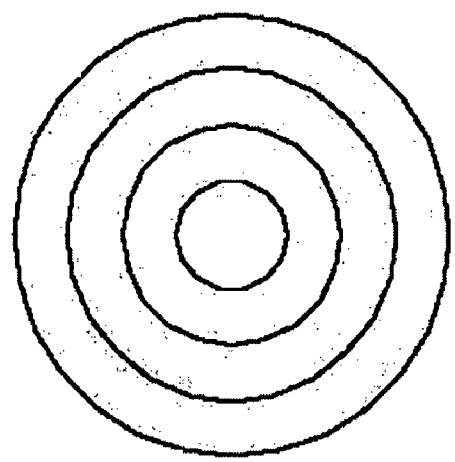
FIG. 8B is a front elevation view of a field-mapped circular ring illuminator made from segmented positive axicon lenses.
Figure 8A:
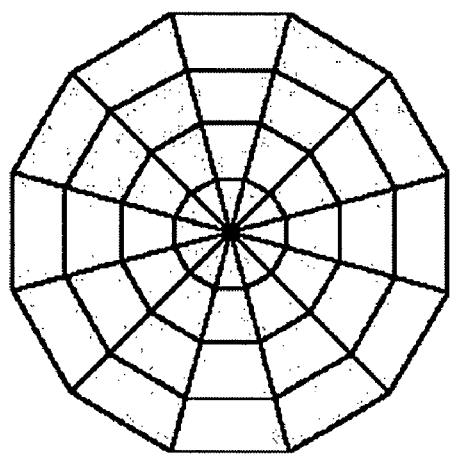
FIG. 8A is a front elevation view of a field-mapped circular ring illuminator made from segmented plano-convex cylinder lenses.

FIGS. 8A, 8B and 8C are field-mapped circular ring illuminators where the lens segments are segmented and placed into a radial pattern to achieve a homogenized annulus. Field-mapping is a term well understood in the art. It refers to the act of segmenting a plurality of identical optical components in a preselected order and placing the optical segments in an organized structure such that light striking each segment causes a light patch to overlap at a desired homogenized shape and distance in the space from the created segment array. A homogenizer creates a homogenized patch of light at some plane in space. A circular ring illuminator is a homogenizer that creates an annulus of light that looks like a very thick, centrally apertured washer.

More particularly, FIG. 8A depicts positive, plano-convex cylindrical lenses that are segmented as illustrated, and FIG. 8B depicts a radially segmented axicons where each axicon segment has a different conic constant to map the light into a homogenized annulus of light.

Figure 8D:
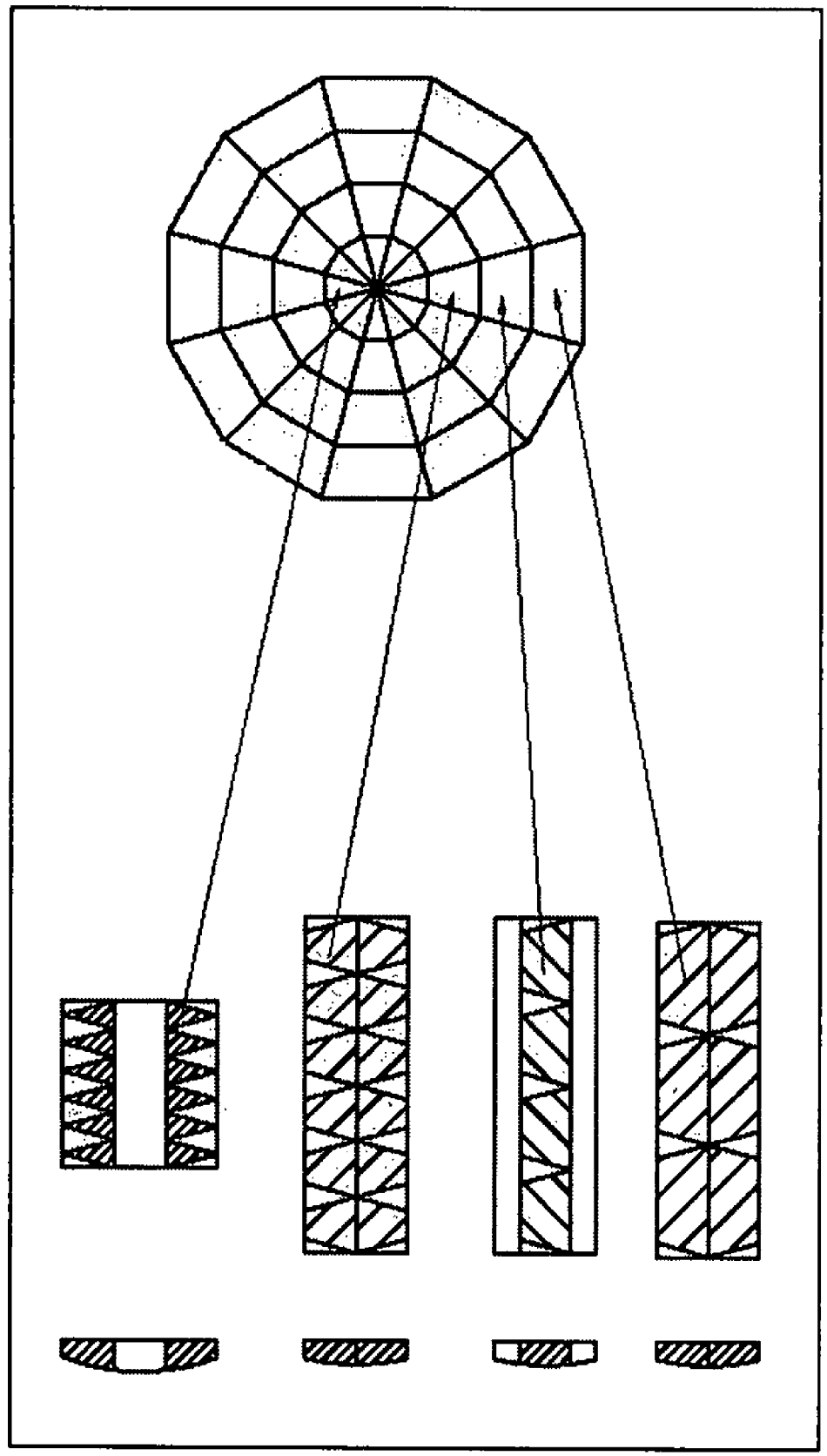
FIG. 8D depicts the segmenting of four (4) cylindrical, plano-convex lenses into a field-mapped circular ring illuminator.

FIG. 8D illustrates the segmenting of four (4) different positive, plano-convex cylindrical lenses having identical focal lengths. For illustrative purposes, the radial length of each segment in FIG. 8A is 3 mm and each lens is segmented as shown. The top cylindrical lens is segmented into twelve (12) pie-shaped pieces (indicated by hatch marks) and placed into the array circumferentially to form the inner segments of the array. The second radial array is formed by segmenting the second plano-convex cylindrical lens as shown of which twelve (12) trapezoid-shaped pieces (indicated by hatch marks) are positioned circumferentially. The third plano-convex cylindrical lens is segmented as shown by the hatch marks. As there are only four (4) segments per cylindrical lens, three such lenses are needed to place the desired twelve proportionally larger trapezoidal segments into the radial array as illustrated. Lastly, the outer proportionally larger trapezoidal segments are formed by taking the last illustrated plano-convex cylindrical lens and segmenting according to the hatch marks. In this instance four (4) identical cylindrical lenses need to be so segmented and placed circumferentially as depicted by the figure into the outer array. In all cases, it is only important to segment the lenses as shown by the hatch marks and placed radially as depicted by the arrows in the drawing. The circumferential position for each segment in a radial array is unimportant as each lens is identical to the other. Each segment is a plano-convex or plano-concave cylindrical optic, depending upon the desired design and homogenized field required.

FIG. 8E is a ray trace of a circular ring illumination using positive axicon segments.

Figure 8F:
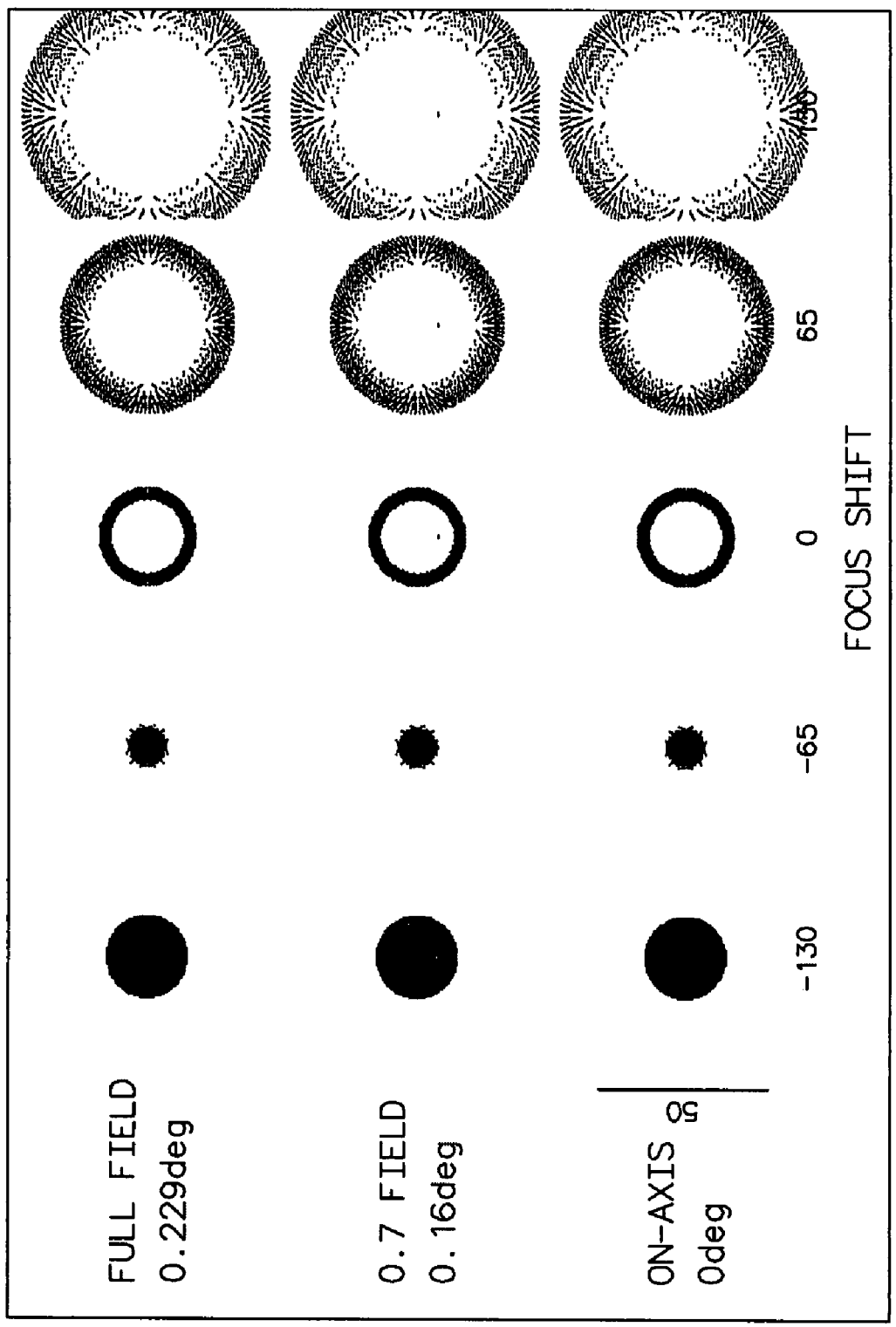
FIG. 8F is a spot diagram of the field-mapped ring illuminator of FIG. 8B.
Figure 8H:
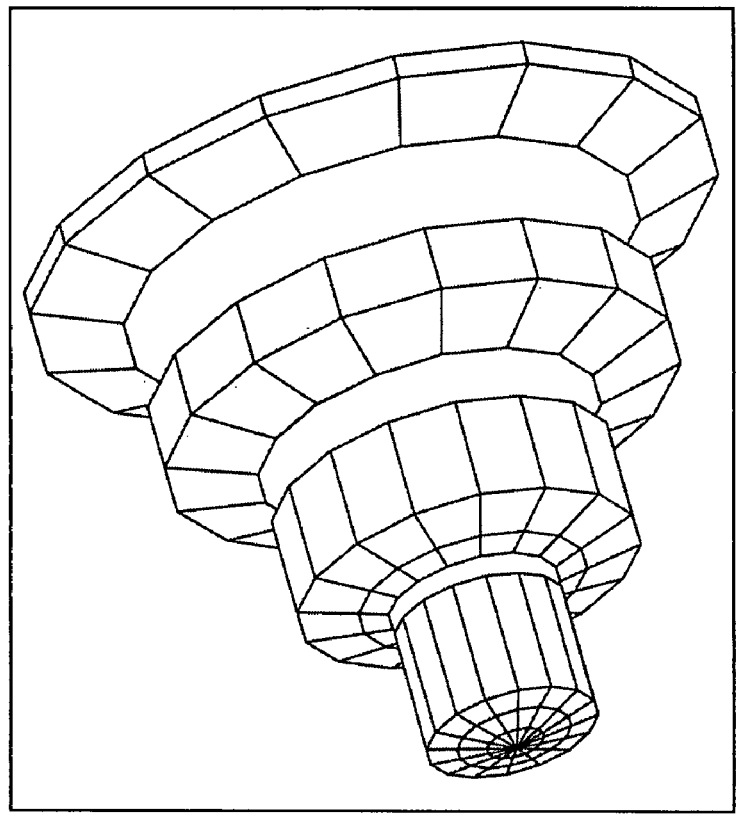
FIG. 8H is a three dimensional prospective view of the segmented axicon elements that make up the field-mapped axicon ring illuminator of FIG. 8B.
Figure 8G:
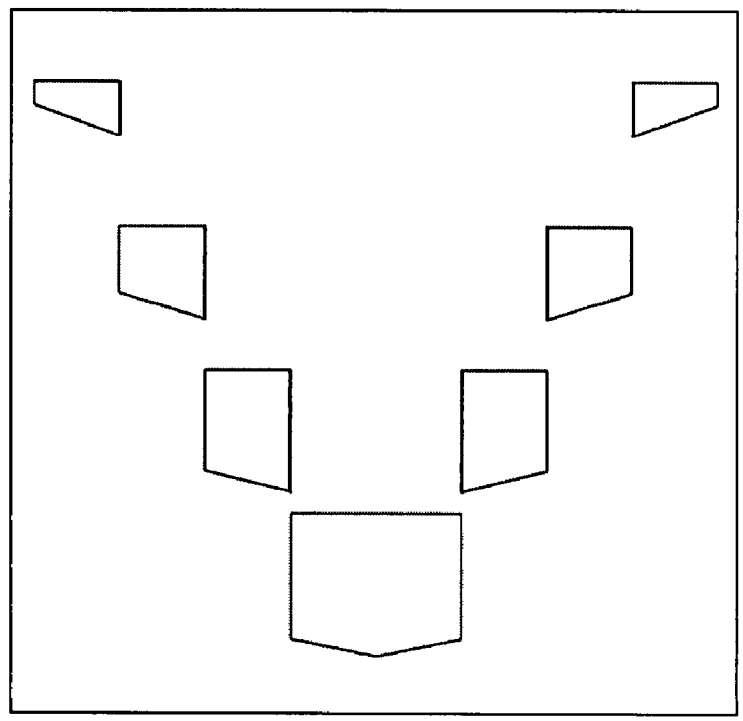
FIG. 8G is a two dimensional cross sectional view of the segmented axicon elements which form the field mapped axicon ring illuminator of FIG. 8B.

FIG. 8F is a spot diagram with a +/−130 mm focus shift of the homogenized field formed from the field-mapped circular ring illuminator of FIG. 8E. This produces an annulus with a radial distance of 3 mm. FIG. 8G and FIG. 8H show how the axicons are cut and placed to create the field-mapped axicon ring illuminator. In the example of FIGS. 8B, 8E, 8F, 8G and 8H, the conic constant for the central axicon is 0.2 and has a diameter of six (6) mm. The next radial axicon segment has a conic constant of 0.25 with an inside diameter of six (6) mm and an outside diameter of nine (9) mm, again with a radial length of three (3) mm. The third axicon segment from the center has a conic constant of 0.30 and an inside diameter of nine (9) mm and an outside diameter of twelve (12) mm and a radial length of three (3) mm. The last axicon segment has a conic constant of 0.35 with an inside diameter of twelve (12) mm and an outside diameter of fifteen (15) mm and a three (3) mm radial length. The segments are placed coincident with each other to form the field-mapped axicon array homogenizer.

The conic constants are selected so that light from each segment overlaps at a distance of 121 mm from the axicon array. The homogenized annulus of light has a radial length of three (3) mm which matches the selected axicon segments mentioned above. The homogenized ring of light matches the radial length of the axicon segments. The degree of homogenization is determined by the number of segments used, i.e., the degree of homogenization increases as the number of segments increases.

Segmenting the smaller, central elements in FIG. 8A is difficult as the segments are small and therefore susceptible to chipping and much diffraction of the high intensity of the central portion of a Gaussian laser beam. Therefore, the inner segments could be replaced with a single, small diameter axicon with a suitable conic constant to match the cylindrical lens segments of the second, third and fourth radial arrays depicted in FIG. 8D. FIG. 8C illustrates this hybrid combination of FIG. 8A and FIG. 8B.

FIG. 8I is a ray trace of the field-mapped circular ring illuminator of FIG. 8C which is a combination of employing plano-convex cylinder lens segments in a similar manner as the lens segments in FIGS. 6A and 6B but with the segments laid out in a radial position. Moreover, the central region uses a small diameter axicon lens. The dotted line represents the light path for the axicon and the solid lines are for the cylindrical elements.

Other machining methods of glass such as diamond turning, reactive ion etching or electron beam etching could create more efficient structures where the rings are formed with true arcs instead of straight segments as depicted in FIGS. 8A and 8C. Such methods would also have utility in fabricating cylindrical, plano-convex or concave rings. This would reduce the total number of segments and improve the diffraction efficiency of the device. Such methods are within the scope of this invention.

The field mapped homogenizer that includes the negative lens segments has the advantage of not having a pupil in the system. This eliminates damage to mirrors or other optics downstream from the homogenizer. In both case, a positive or negative lens can be placed after the homogenizer to increase or decrease the size of the homogenizer. Equally, a zoomable lens system (FIGS. 9A and 9B) allows a user to dynamically alter the size of the homogenized field.

Figure 9A:
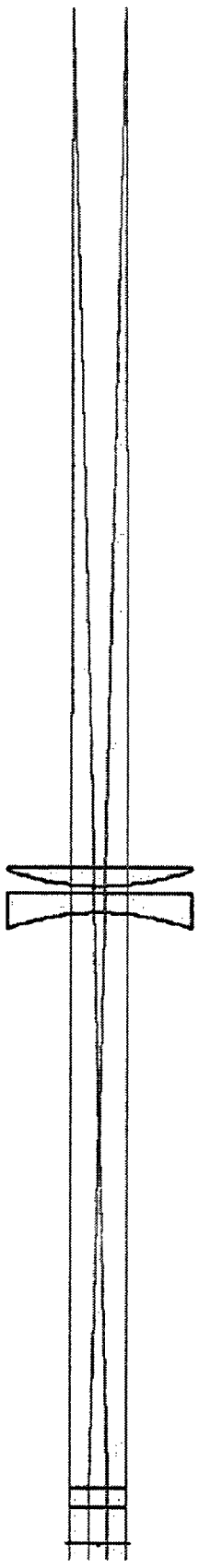
FIG. 9A is a diagrammatic view of a zoomable lens when configured to produce a 15 mm homogenized field.
Figure 9C:
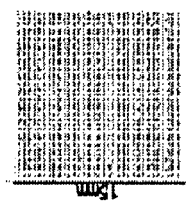
FIG. 9C is a spot diagram produced by the lens array of FIG. 9A.
Figure 9B:
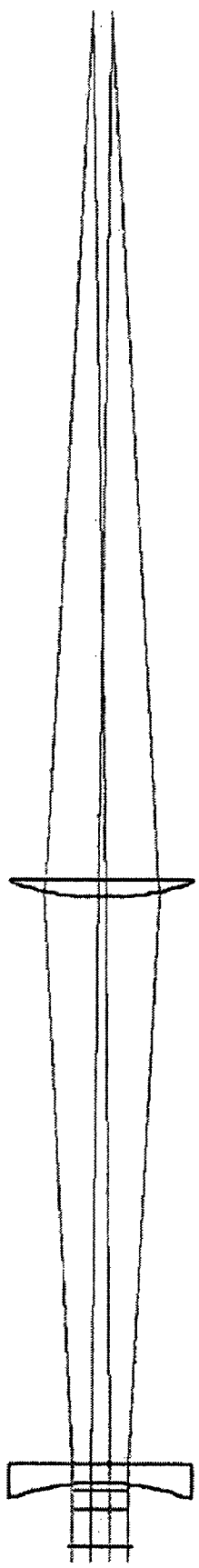
FIG. 9B is a diagrammatic view of a zoomable lens when configured to produce a 5 mm homogenized field.

More particularly, FIGS. 9A and 9B illustrate the field mapped homogenizer with an adjustable zoom system, including a negative and a positive lens system. The positive lens is fixed in FIG. 9A and the negative lens is moved between the homogenizer array and the positive lens as depicted in FIG. 9B. The absolute values of the focal lengths of the positive and negative lenses are identical and this provides an approximately three (3) times change in the homogenized field size. Such a zoom lens, as illustrated in FIGS. 9A and 9B with the field mapped homogenizer depicted in FIG. 1, provides a field change from fifteen millimeters to five millimeters (15 mm-5 mm).

In FIGS. 9A and 9B, the zoomable optics changes the homogenized field from 15 mm to 5 mm. In FIG. 9A, a plano-concave lens is positioned remote from a homogenizer array, and in FIG. 9B, the plano-concave lens is positioned in close proximity to the homogenizer array.

Figure 9D:
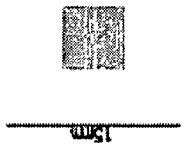
FIG. 9D is a spot diagram produced by the lens array of FIG. 9B.

FIG. 9C is a spot diagram of the FIG. 9A arrangement and FIG. 9D is a spot diagram of the FIG. 9B arrangement.

This invention uses significantly fewer optical surfaces to achieve the same level of homogenization as prior art integrator concepts, and the fabrication methods are easy and straightforward. The unit is much easier to align than prior art devices because it employs symmetrical optics and only requires reasonably careful alignment with respect to the X and Y axis from the optical axis.

The device is fairly insensitive to minor angular errors when spherical segments are used. Adding simple optical components post the device permit the homogenized field to be zoomed to different sizes which further adds flexibility and usefulness of the design. The invention could be implemented on the micro level to cover larger fields for display devices whereby the lens segments are either fabricated by diamond turning, electron beam or reactive ion etching for forming the lenticular arrays or to accommodate more complex fields having radial geometries and the like. The invention is therefore not limited to rectangular fields because other geometries can be realized, limited only by fabrication techniques of the arrays.

In the preferred embodiment, there is no pupil following the array which could damage optics downstream as the light emerging from the array is diverging. A condenser lens is placed just before the mask being illuminated to collect the light through the rest of the imaging system as is typical for all projection systems that include an integrator.

This invention reduces optical losses because the array includes no condenser. Moreover, the lens segments that make up the array can have long radii of curvatures which keeps the numerical aperture of the system very low. This helps reduce the beam path needed to accommodate the homogenizer. The prior art typically requires a condenser with a focal length of one (1) meter plus the length needed for two pairs of crossed cylindrical lenses. This requires a homogenizer having a focal length of about one and a half meters (1.5 m). In sharp contrast, the preferred embodiment of this invention has a focal length less than two hundred millimeters (200 mm) with undiminished performance.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method of homogenizing light, comprising the steps of:
    providing a plurality of large diameter lenses selected from a group of lenses consisting of positive or negative spherical lenses and positive or negative cylindrical lenses;
    selecting a predetermined number of lenses from said group of lenses;
    creating a plurality of lens segments from each selected lens by segmenting each selected lens by forming a first plurality of cuts parallel to a Y axis of each selected lens and each cut of said first plurality of cuts being spaced apart by a common predetermined distance, and by forming a second plurality of cuts parallel to an X axis of each selected lens and each cut of said second plurality of cuts being spaced apart by said predetermined distance so that all lens segments of said plurality of lens segments have a common width and height;
    selecting from each plurality of lens segments a predetermined number of lens segments;
    arranging the selected lens segments in a predetermined array so that the light passing through each lens segment, when arranged in said predetermined array, recombines at a common plane;
    each lens segment in said predetermined array being unique, there being no two lens segments in said predetermined array having the same optical characteristics.

2. The method of claim 1, further comprising the step of:
    selecting said lens from a group of lenses consisting of lenses having a nominal diameter of about fifty millimeters (50 mm).

3. The method of claim 1, further comprising the step of:
    selecting said lenses from a group of spherical plano-concave lenses.

4. The method of claim 1, further comprising the step of:
    selecting said lenses from a group of spherical plano-convex lenses.

5. The method of claim 1, further comprising the step of:
    selecting said lenses from a group of cylindrical plano-concave lenses.

6. The method of claim 1, further comprising the step of:
    selecting said lenses from a group of cylindrical plano-convex lenses.

7. The method of claim 1, further comprising the steps of:
    selecting a first lens from said plurality of large diameter lenses;
    segmenting said first lens by forming a first Y axis cut along a central Y axis of said first lens and further segmenting said first lens by forming additional cuts parallel to said first Y axis cut at a common predetermined distance on opposite sides of said central Y axis;
    further segmenting said first lens by forming first and second X axis cuts a predetermined distance parallel to a central X axis of said first lens on opposite sides of said central X axis, and further segmenting said first lens by forming additional cuts parallel to said first and second X axis cuts at said predetermined distance on opposite sides of said central X axis to thereby provide a plurality of square lens segments where each square lens segment has unique optical characteristics;
    selecting a second lens from said plurality of large diameter lenses;
    segmenting said second lens by forming first and second Y axis cuts a predetermined distance from a central Y axis of said second lens on opposite sides thereof in parallel relation to said central Y axis and repeating said segmenting by forming additional cuts parallel to said first and second Y axis cuts at said predetermined distance on opposite sides of said central Y axis;
    further segmenting said second lens by forming first and second X axis cuts said predetermined distance from a central X axis of said second lens on opposite sides thereof in parallel relation to said central X axis and repeating said segmenting by forming additional cuts parallel to said first and second X axis cuts at said predetermined distance on opposite sides of said central X axis;
    selecting a third lens from said plurality of large diameter lenses;
    segmenting said third lens by forming a first X axis cut coincident with a central X axis of said third lens and further segmenting said third lens by forming additional cuts parallel to said first X axis cut at a common predetermined distance on opposite sides of said central X axis;

further segmenting said third lens by forming a first Y axis cut coincident with a central Y axis of said third lens and further segmenting said third lens by forming additional cuts parallel to said first Y axis cut at said predetermined distance on opposite sides of said central Y axis;

selecting a fourth lens from said plurality of large diameter lenses;

segmenting said fourth lens by forming a first X axis cut coincident with a central X axis of said fourth lens and further segmenting said fourth lens by forming additional cuts parallel to said first X axis cut at a common predetermined distance on opposite sides of said central X axis;

further segmenting said fourth lens by forming first and second Y axis cuts a predetermined distance from a central Y axis of said fourth lens on opposite sides thereof in parallel relation to said central Y axis and repeating said segmenting by forming additional cuts parallel to said first and second Y axis cuts at said predetermined distance on opposite sides of said central Y axis; and forming a square, three times three (3×3) homogenizer by positioning a central lens segment from said second lens in the center of an array, positioning two preselected lens segments from said first lens on opposite sides of said central segment on an X axis, positioning two preselected lens segments from said fourth lens above and below said central segment on a Y axis, and positioning four preselected lens segments from said third lens segments in said array to complete said square homogenizer.

8. The method of claim 7, further comprising the steps of:
selecting said two lens segments from said first lens by selecting two lens segments contiguous to one another on opposite sides of said central Y axis that are bisected by said central X axis;

and selecting said two lens segments from said fourth lens by selecting two lens segments contiguous to one another on opposite sides of said central X axis that are bisected by said central Y axis.

9. The method of claim 1, further comprising the steps of:
selecting four lenses from said group of lenses;
forming a three times three (3×3) homogenizer by selecting nine (9) segments from said four lenses and arranging said nine (9) segments in a predetermined 3×3 array.

10. The method of claim 9, further comprising the steps of:
positioning a first lens segment of the second lens in a central position of said array, said first lens segment having an optical axis coincident with an optical axis of said second lens;

selecting a second and third lens segments from said first lens, said second and third lens segments being contiguous to one another, being bisected by said central X axis, and being positioned on opposite sides of said central Y axis, and positioning said second and third lens segments on opposite sides of said central lens segment in contiguous relation thereto;

selecting a fourth and a fifth lens segments from said fourth lens, said fourth and fifth lens segments being contiguous to one another, being positioned on opposite sides of said central X axis, being bisected by said central Y axis, and positioning said fourth and fifth lens segments above and below said central segment in contiguous relation thereto;

selecting a sixth, seventh, eighth, and ninth lens segments from said third lens, each of said lens segments having one corner positioned at the center of said third lens, said sixth and seventh lens segments being contiguous to one another, being positioned above said central X axis and being on opposite sides of said central Y axis, and said eighth and ninth lens segments being contiguous to one another, being positioned below said central X axis and being on opposite sides of said central Y axis.

11. The method of claim 1, further comprising the steps of:
selecting a first lens from said plurality of large diameter lenses;

sectioning said first lens by forming a first Y axis cut along a central Y axis of said first lens and further sectioning said first lens by forming additional cuts parallel to said first Y axis cut at a common predetermined distance on opposite sides of said central Y axis;

further sectioning said first lens by forming first and second X axis cuts a predetermined distance parallel to a central X axis of said first lens on opposite sides of said central X axis, and further sectioning said first lens by forming additional cuts parallel to said first and second X axis cuts at said predetermined distance on opposite sides of said central X axis to thereby provide a plurality of square lens segments where each square lens segment has unique optical characteristics.

12. A method of homogenizing light, comprising the steps of:
field-mapping a circular ring illuminator to define a plurality of lens segments;

segmenting each lens segment of said plurality of lens segments;

placing the segmented lens segments into a radial pattern to achieve a homogenized annulus;

providing a plurality of different lenses having identical focal lengths;

segmenting a first lens of said plurality of different lenses into a first group of twelve pie-shaped segments;

placing said first group of twelve pie-shaped segments of said first lens into radially innermost positions in a circumferential array to form inner segments of said homogenized annulus;

segmenting a second lens of said plurality of different lenses into a group of twelve trapezoid-shaped segments and positioning said twelve trapezoid-shaped segments in a circumferential array, contiguous to one another and contiguous to and radially outward of said first group of twelve pie-shaped segments;

segmenting a third lens of said plurality of different lenses into a first group of four trapezoid-shaped segments;

segmenting a fourth lens, identical to said third lens, into a second group of four trapezoid-shaped segments;

segmenting a fifth lens, identical to said third and fourth lens, into a third group of four trapezoid-shaped segments;

positioning the twelve trapezoid-shaped segments of said first, second, and third group of trapezoid-shaped segments of said third, fourth, and fifth lenses, respectively, in a circumferential array, contiguous to one another and contiguous to and radially outward of said twelve trapezoid-shaped segments of said second lens;

segmenting a sixth lens into a first group of three trapezoid-shaped segments;

segmenting a seventh lens, identical to said sixth lens, into a second group of three trapezoid-shaped segments;

segmenting an eighth lens, identical to said sixth and seventh lenses, into a third group of three trapezoid-shaped segments;

segmenting a ninth lens, identical to said sixth, seventh, and eighth lenses, into a fourth group of three trapezoid-shaped segments; and positioning the twelve trapezoid-shaped segments of said first, second, third and fourth groups of trapezoid-shaped segments of said sixth, seventh, and eighth, and ninth lenses, respectively, in a circumferential array, contiguous to one another and contiguous to and radially outward of said twelve trapezoid-shaped segments of said third lens.

13. The method of claim 12, further comprising the steps of:

forming said lens segments from a plurality of positive, plano-convex cylindrical lenses.

14. The method of claim 12, further comprising the steps of:

forming said lens segments from a plurality of a plano-concave cylindrical lenses.

15. The method of claim 12, further comprising the steps of:

forming said lens segments from a plurality of radially segmented axicons where each axicon segment has a different conic constant to map the light into a homogenized annulus of light.

* * * * *